3,198,638
METHOD FOR SEASONING FOODSTUFFS AND RESULTING PRODUCTS
Katsuharu Yasumatsu, Ikeda, and Yoshio Nakao, Osaka, Japan, assignors to Takeda Chemical Industries, Ltd., Osaka, Japan
No Drawing. Filed July 21, 1961, Ser. No. 125,652
Claims priority, application Japan, July 25, 1960, 35/32,837
21 Claims. (Cl. 99—140)

The present invention relates to a method for seasoning foodstuff. More particularly, it relates to a method for improving the taste or flavor of foodstuff by the addition of at least one of a group of seasoning additaments constituted by deoxy-5'-inosinic acid, deoxy-5'-guanylic acid, and their salts.

It has been known widely that monosodium glutamate or sodium succinate has the ability to bring out the natural flavor of food, and that both of these have been used for improving the taste or flavor of food in the home and restaurants, and in the processing of such things as wine, meats and canned goods. Sodium inosinate has also been known as a substance having a similar effect.

The rich flavor of soup-stock of any kind is considered to result from soluble components in such substances, especially from the above-mentioned chemical compounds. Hydrolyzates of animal or vegetable proteins, obtained by the action of acids or protease of microorganisms, or its processed matters, are also known and used as chemical condiments for foodstuff. Chemical condiments of this kind generally contain various amino acids as their chief components.

Each of the hitherto-known chemical condiments is used in a food industry or in cooking independently, or it may sometimes be used in admixture with other similar chemical condiments. For example, 5'-inosinic acid may sometimes be used in combination with monosodium glutamate. Alternatively, known chemical condiments are sometimes used together with a natural condiment such as dried bonito (so called Katsuobushi) to improve the taste or flavor of foodstuff. In this case, the taste or flavor so improved is deemed to result from the synergy between the chemical condiments and 5'-inosinic acid contained in the dried bonito.

All these chemical condiments are useful for the improvement of the taste or flavor of foodstuff, but the respective tastes so enhanced or improved by the addition thereof are not the same. In other words, each of them has its own specificity in seasoning foodstuff.

The present invention is based on the observation that other chemical compounds than those hithertoknown can improve or enhance the taste or flavor of foodstuff in a wider scope, and that this is true especially in the field relating to dioxyribonucleic acids (DNA) and their hydrolyzates. As a result of the present invention, it has been clarified that the taste or flavor of foodstuff can be improved or enhanced by the addition of deoxy-5'-inosinic acid, deoxy-5'-guanylic acid, or their salts or derivatives, which have hitherto never been used as a chemical condiment, and the capacities of which to improve or enhance the taste or flavor of foodstuffs have not hitherto been known; that deoxy-5'-xanthylic acid, its salts or derivatives impart desirable deliciousness to foodstuffs, so that they may be used as a chemical condiment for seasoning the latter; and that such 5'-deoxyribonucleotides as deoxy-5'-thymidylic acid, deoxy-5'-cytidylic acid, or their derivatives themselves hardly have a delicious taste, but may nevertheless advantageously be used as chemical condiment in the form of a mixture with deoxy-5'-inosinic acid, etc.

The present invention contemplates the improvement or enhancement of the taste or flavor of foodstuff in broader aspects by the addition thereto of deoxy-5'-inosinic acid or deoxy-5'-guanylic acid or their derivativies.. The present invention has, thus, special utility in the food industries and/or in cooking for household.

It is an object of the present invention to provide a novel utility for deoxy-5'-inosinic acid, dexoy-5'-guanylic acid, and their derivatives in the food industries and/or in cooking.

Deoxy-5'-inosinic acid and deoxy-5'-guanylic acid can be obtained from a hydrolyzate of deoxyribonucleic acid or oligodeoxyribonucleotides which are extracted from such organisms or organs or tissues as bacteria, cattle thymus, cattle semen, herring semen, etc. The hydrolysis can be effected by means of an enzyme system of snake venom or of a microorganism. The hydrolysis can be conducted by a purely chemical process, because chemical hydrolysis does not produce deoxy-5'-inosinic acid nor deoxy-5'-guanylic acid. As the enzyme system of snake venom is hardly obtainable, it is rather preferable to utilize that of microorganisms. The enzyme system which can hydrolyze deoxyribonucleic acids or oligodeoxyribonucleotides into 5'-deoxyribonucleotides, etc. is distributed among those microorganisms which belong to the class of Schizomycetes, Ascomycetes, etc., more particularly among microorganisms belonging to the order Fungi Imperfecti (e.g. genera Fusarium, Verticillium, Gliomastrix, or Helminthosporium), order Eubacteriales (e.g. genus Bacillus), order Actinomycetals (e.g. genus Streptomyces), order Sphaeriales (e.g. genera Anixiella, Botryosphaeria, Chaetomidium, Glomerella, Neurospora, Ophiobolus, Sordaria, Tilaclidium, etc.) and order Plectascales (e.g. genus Aspergillus), for instance.

Deoxyribonucleic acids or oligodeoxynucleotides can be hydrolyzed favorably by the enzyme system of such microorganisms as above enumerated. The hydrolysis may be effected by (1) incubating the microorganism on a deoxyribonucleic acid- and/or oligodeoxynucleotide-containing medium, (2) allowing the culture broth, filtered broth or cell- or mycelium-suspension of the microorganism to react with deoxyribonucleic acids and/or oligodeoxyribonucleotides, or (3) allowing the enzyme system, after purification, to react with deoxyribonucleic acids and/or oligodeoxyribonucleotides. Among these, the second process is the most preferable for industrial purposes. More particularly, the microorganism is incubated by aerobic submerged culture in an aqueous medium at a suitable temperature for a proper period for accumulating the desired enzyme system; the culture broth may be employed as the enzyme source or may be filtered to obtain a crude enzymatic solution and cell- or mycelium-body, either of which may be used as the enzyme source for the hydrolysis. The enzyme source thus obtained is added to a solution containing deoxyribonucleic acids and/or oligodeoxynucleotides, and then the mixture is kept standing at a suitable temperature for a proper period to complete the desired hydrolysis. When the enzyme source is contaminated with phosphomonoesterase, desired deoxy-5'-ribonucleotides are further hydrolyzed into the corresponding deoxyribonucleosides, so that it is necessary to take steps to inhibit the phosphomonoesterase activity. This may be realized, for example, by the addition of a phosphomonoesterase-inhibitor such as an arsenate, phosphate, cyanate, fluoride or a phenolic compound such as phenol, cresol, etc., to the reaction mixture; or by heat treatment at a temperature of 40–60° C. at a pH of 3.5–5.0.

Further, as deaminase is contained in these enzyme sources, deoxy-5'-adenylic acid, a component of deoxyribonucleic acid, is deaminated to form deoxy-5'-inosinic acid. Therefore, this process employing one of the said enzyme sources is very advantageous for producing deoxy-5′-inosinic acid in a very good yield.

Thus, in the reaction mixture, desired deoxy-5′-inosinic acid and deoxy-5′-guanylic acid are produced together with other 5′-deoxyribonucleotides such as deoxy-5′-adenylic acid, deoxy-5′-cytidylic acid, deoxy-5′-thymidylic acid, etc. which have little desired activity. The reaction mixture contains various impurities, such as proteins, sugars, cells or mycelia, inorganic salts, other culture products, etc. However, deoxy-5′-inosinic acid or deoxy-5′-guanylic acid may be used for the purpose of this invention as long as it is not contaminated with a component or components which have unpleasant or undesirable odor or taste or are toxic or harmful. When the components are not contaminated, the filtrate of the reaction mixture may be concentrated or dried in conventional manner to obtain a liquid or powdery deoxy-5′-inosinic acid- and/or deoxy-5′-guanylic acid containing substance utilizable as condiment according to the present invention. However, when there are contained such components as have unpleasant odor or taste in the reaction mixture, it is desirable to submit the reaction mixture or its filtrate to a purification process or processes.

The purification of the deoxy-5′-ribonucleotides thus obtained may be conducted by means of a strongly acidic cation exchange resin such as Amberlite IR–120 (Rohm & Haas Co.). Such a resin can adsorb deoxy-5′-inosinic acid, deoxy-5′-guanylic acid, deoxy-5′-thymidylic acid, and deoxy-5′-cytidylic acid, and the solution obtained by eluting the resin with an aqueous solvent contains deoxy-5′-inosinic acid and/or deoxy-5′-guanylic acid. Alternatively, the reaction mixture is treated with a weakly acid ion exchange resin to remove basic impurities, and the matter left unadsorbed contains deoxy-5′-ribonucleotides. From the said solution, crude deoxy-5′-inosinic acid, deoxy-5′-guanylic acid, etc. can be separately or simultaneously collected by concentration. Also, the solution may be neutralized to obtain alkaline salts of deoxy-5′-inosinic acid and doxy-5′-guanylic acid. The reaction mixture may also be processed by means of electrophoresis using an ion exchange resin membrane to purify deoxy-5′-inosinic acid and/or deoxy-5′-guanylic acid.

Further purification may be conducted by adsorption or partition chromatography on a suitable adsorbent such as active charcoal, silica gel and cellulose powder.

Deoxy-5′-inosinic acid or deoxy-5′-guanylic acid is usable for the purpose of this invention, for example in the form of its free acid, alkali metal salt, alkaline earth metal salt, ammonium salt, histidine salt, acid amide, etc. In addition to their pure forms, deoxy-5′-inosinic acid and deoxy-5′-guanylic acid containing impurities having no unpleasant odor or taste or toxicity may be utilized. Negligible impurities are inorganic salts, nucleotides or nucleosides. Thus a crude hydrolyzate of deoxyribonucleic acid or oligonucleotides from which undesirable components have been removed may also be utilized in the present invention.

Although deoxy-5′-xanthylic acid has never been detected as a component of natural deoxyribonucleic acid, it can be derived from deoxy-5′-guanylic acid. The semisynthesis of deoxy-5′-xanthylic acid from deoxy-5′-guanylic acid may for example be effected as follows: deoxy-5′-guanylic acid is first converted into its 2-diazonium salt by means of a nitrite and an acid, and then the diazonium salt is hydrolyzed into the hydroxyl group with an acid. Deoxy-5′-xanthylic acid seems to be a little weaker than deoxy-5′-guanylic acid in improving the taste or flavor of foodstuff. However, the taste or flavor so improved or enhanced with deoxy-5′-xanthylic acid is quite good.

These new chemical condiments are stable against heat, and therefore they are conveniently isolated or collected from the hydrolyzate of deoxyribonucleic acid, etc. and used in cooking or in storing foodstuffs.

The taste or flavor of all the foodstuffs for which the hitherto-known chemical condiments have been used are improved or enhanced by the addition of the chemical condiments of the present invention, irrespective of the kind or the form of the foodstuffs, for example, soups, sauces, pastes, sausages, canned foods, salad, boiled foods, pickles, alcoholic drinks, vinegars, table salt, breads, fruit juices, fermented foodstuff, etc. The chemical condiments of the present invention may be added to the foodstuffs during or after cooking. In other words, they can be added to raw materials of foodstuffs or to cooked foodstuffs.

The quantity of the new chemical condiments to be added to foodstuffs can easily be determined according to the form, kind and other conditions of foodstuff. However, more or less excess of the condiments imparts no unpleasant taste to the foodstuff. The taste of flavor of deoxy-5′-inosinic acid or deoxy-5′-guanylic acid is detectable in a concentration of around 0.015% by weight, but suitable concentration is around 0.2 to 0.002 percent by weight in liquid foodstuff.

The new chemical condiments have a deliciousness similar to that of 5′-inosinic acid and they are favorably used together with the hitherto-known chemical condiments such as monosodium glutamate, sodium succinate, sodium inosinate, etc. for the purpose of improving or enhancing taste and flavor. Therefore, it is also effective to add the new chemical condiments to the other known condiments such as amino acid condiment, and especially their mixture with sodium glutamate exhibits very good deliciousness.

When the new chemical condiment is added to such a fermented foodstuff as bean paste (miso), sake, whiskey, soy, etc., it is desirable that the phosphomonoesterase in the foodstuff be inactivated or removed prior to the addition of the chemical condiments.

The adequate concentrations of sodium deoxy-5′-inosinate to be added to several kinds of foodstuffs are listed below in comparison with those of sodium glutamate.

| Foodstuff | Sodium deoxy-5′-inosinate percent by weight | Monosodium glutamate, percent by weight |
| --- | --- | --- |
| Soy | 0.1 | 0.3 |
| Soup (both in Japanese and Western Style) | 0.03 | 0.1 |
| Bean paste soup | 0.05 | 0.1 |
| Vinegared dish | 0.1 | 0.1 |
| Sake | 0.014 | 0.1 |

Following are presently preferred exemplary embodiments of this invention.

*Example 1*

To 100 grams of deoxyribonucleic acid obtained from herring semen there are added 10 liters of culture filtrate of *Streptomyces aureus* (Waksman et Curtis), Waksman et Henrici (IFO–3303; ATCC–13404). Further, sodium arsenate is added to the mixture to make its final concentration 10 mM. Then, the pH of the mixture is adjusted to 8.5, and the mixture is kept at 37° C. for 8 hours. The hydrolyzate is passed through a layer of active charcoal to adsorb deoxyribonucleotides. The active charcoal is eluted with a mixture of ammonia and ethanol, then the eluate is concentrated to dryness to obtain a powdery condiment containing deoxy-5′-guanylic acid and deoxy-5′-inosinic acid, the total quantity of which components is about 50% of the powdery condiment. Raw soya which has been brewed by a conventional fermentation and filtered through a filter press is heated to inactive phosphomonoesterase in the malted rice employed in the fermentation. In 1 liter of the raw soya thus treated, there are dissolved 4 grams of the condiment prepared as above to bring out an improved taste or flavor of the soya.

Example 2

To 100 grams of herring semen desoxyribonucleic acid, there are added 10 liters of culture filtrate of *Aspergillus quercinus* (Bainier), Thom et Church (IFO–4363; ATCC–14307). The mixture is then hydrolyzed at 37° C. for 8 hours at a pH of 8.5, followed by the addition of 50 grams of culture mycelia. The mixture so prepared is subjected, at a pH of 5.0, to hydrolysis at 37° C. for 1 hour to convert deoxy-5'-adenylic acid into deoxy-5'-inosinic acid, and then is passed through a layer of active charcoal to adsorb the deoxy-5'-inosinic acid. The active charcoal is eluted with a mixture of ammonia and ethanol, then the eluate is concentrated to dryness to obtain a powdery condiment containing deoxy-5'-guanylic acid and deoxy-5'-inosinic acid, the total quantity of which components is about 40% of the powdery condiment. Refined sake prepared by removing lees from moromi is heated to inactivate phosphomonoesterase present. To 1 liter of the so treated sake, there is added 0.2 gram of the condiment prepared as above to enhance the flavor of the refined sake.

Example 3

To 1 liter of vegetable soup to which there has been added an adequate quantity of table salt, there is added 0.2 gram of the condiment obtained as in Example 2 and 0.5 gram of monosodium glutamate, whereupon the taste or flavor of the soup is greatly improved.

Example 4

To 100 grams of herring semen deoxyribonucleic acid there are added 10 liters of culture filtrate of *Botryosphaeria ribis chromogena* G. et D. (IFO–4837; ATCC–13834), The mixture is hydrolyzed at 37° C. for 10 hours, its pH being kept at around 8.5. The hydrolyzate is passed through a layer of active charcoal to absorb deoxyribonucleotides produced. The active charcoal is eluted with a mixture of ammonia and ethanol, then the elute is concentrated.

By means of ion-exchange resin, the concentrate is fractionated into four components of deoxyribonucleotides. Deoxy-5'-adenylic acid derived from the original deoxyribonucleic acid has been transformed into deoxy-5'-inosinic acid by deamination of the former with nitrous acid. In 1 liter of raw soya are dissolved 2 grams each of the so-obtained deoxy-5'-inosinic acid and deoxy-5'-guanylic acid to bring out the better taste or flavor of the soya.

Example 5

To 50 grams of calf thymus deoxyribonucleic acid, there are added 20 liters of culture filtrate of *Helminthosporium sigmoideum* var. irregulare Cralley et Tullis (IFO–5273, ATCC–13406). After the addition of sodium sulfate to the mixture to make the concentration of the former 10 mM., the mixture is hydrolyzed at 37° C. for 15 hours at a pH of about 8.0. Then deoxy-5'-inosinic acid and deoxy-5'-guanylic acid are obtained through the same process as in Example 4. To 1 liter of vegetable soup to which an adequate quantity of table salt has been added, 0.2 gram deoxy-5'-guanylic acid, 0.2 gram of deoxy-5'-inosinic acid and 0.5 gram of monosodium glutamate are added, whereupon the taste of flavor of the soup is greatly improved.

Example 6

To 100 grams of deoxyribonucleic acid obtained from herring semen, there are added 10 liters of culture filtrate *Stereptomyces aureus* (Waksman et Curtis), Waksman et Henrici (IFO–3303; ATCC–13404). Further, sodium arsenate is added to the mixture to make its final concentration 10 mM. Then the mixture is kept at 37° C. for 8 hours at a pH of 8.5. The hydrolyzate is passed through a layer of active charcoal to adsorb deoxyribonucleotides. The active charcoal is eluted with a mixture of ammonia and ethanol. The elute is allowed to flow through "Dowex-1 (formate-type)" (trade name of an anion-exchange resin sold by Dow Chemical Co., U.S.A.) to adsorb deoxy-5'-inosinic acid and deoxy-5'guanylic acid, then the resin is eluted with an aqueous solution containing 0.1 N-formic acid and 0.05 N-sodium formate to remove doxy-5'-inosinic acid. The eluate is again brought into contact with active charcoal to adsorb deoxy-5'-inosinic acid and the charcoal is eluted with ammoniacal ethanol. The eluate is concentrated to dryness to obtain deoxy-5'-inosinic acid.

To 1 liter of chicken broth, there are added 100 milligrams of deoxy-5'-inosinic acid thus obtained, 1 gram of sodium gluamate, and a suitable amount of table-salt and spices, whereby a soup of enhanced flavor and taste is obtained.

Example 7

The resin treated in same manner as in Example 6 is further eluted with an aqueous solution containing 0.1 N-formic acid and 0.1 N-sodium formate to remove deoxy-5'-guanylic acid. The eluate is brought into contact with active charcoal to adsorb deoxy-5'-guanylic acid and the charcoal is eluted with ammoniacal ethanol. The eluate is concentrated to dryness to obtain deoxy-5'-guanylic acid. To 889 milliliters of chicken broth, there are added 50 miligrams of so-obtained deoxy-5'-guanylic acid and 1 gram of sodium glutamate, followed by 7.2 grams of dried milk, 29 grams of rice flour, 0.8 gram of table-salt, 0.82 gram of onion powder, 0.25 gram of black pepper and 0.2 gram of sage. The mixture is cooked to prepare cream of chicken soup of outstanding flavor and taste.

In the preceding examples, "mM." refers to "millimoles." The ammoniacal ethanol used for elution purposes may be advantageously prepared by mixing about 2 to 8 parts by volume of concentrated aqueous ammonia (ca. 28%), about 50 parts by volume of ethanol (ca. 96%) and water to make its volume 100 parts. Adjustment to indicated pH can advantageously be made by the addition of appropriate amount of sodium hydroxide or hydrochloric acid. In each example, the adsorbent resin can of course be replaced by other commerically available quartenary strong base-type resins such as Amberlite IRA–401 (produced by Rohm & Haas Co., Philadelphia, Pennsylvania, U.S.A.), Duolite A–40 (produced by Chemical Process Co., Redwood City, Calif., U.S.A.), Permutit ES (produced by Permutit A. G., Berlin, Germany), Permutit S–2 (Permutit Co., New York, U.S.A.), etc., and the resins can also be replaced by other adsorbent materials such as activated charcoal, etc. with essentially similar results.

Generally processes for synthesizing commercially available ion exchange resins are described in, for example, "Ion Exchange Resins (2nd ed.)," by Robert Kunin, published by John Wiley & Sons, Inc., New York, U.S.A., in 1958, as well as in literatures cited therein; especially in pages 73 to 105 of the former; more specifically, in its pages 82 to 85 for strongly acidic sulfonic acid-type cation exchange resins, in its pages 85 to 87 for carboxylic acid-type cation exchange resins, in its pages 87, 88 and 97 for amine-type anion exchange resins, and each type of commercially available resins is listed in its pages 89 to 96, where resin-types, trade names, manufacturers, and total capacities of the resins are referred.

As is manifest from the foregoing disclosure, the quantity of added chemical condiment according to the present invention is widely variable. A small quantity will usually suffice; an excess will not be prejudicial. For economy purposes, the preferred quantity to be added may, for all practical purposes, be that corresponding to from about 0.002% to about 0.2% by weight—relative to the weight of foodstuff—of deoxy-5'-inosinic acid or deoxy-5'-guanylic acid, although as aforesaid larger amounts will not be deleterious.

Having thus disclosed the invention, what is claimed is:

1. A method for flavor enhancement of foodstuff, which comprises adding at least one member selected from the group consisting of deoxy-5'-inosinic acid, deoxy-5'-guanylic acid, deoxy-5'-xanthylic acid and their non-toxic base salts to the foodstuff.

2. A method for flavor enhancement of foodstuff, which comprises adding at least one member selected from the group consisting of deoxy-5'-inosinic acid, deoxy-5'-guanylic acid, deoxy-5'-xanthylic acid and their non-toxic base salts together with sodium glutamate to the foodstuff.

3. A method for flavor enhancement of foodstuff, which comprises adding deoxy-5'-inosinic acid to the foodstuff.

4. A method for flavor enhancement of foodstuff, which comprises adding deoxy-5'-guanylic acid to the foodstuff.

5. A method for flavor enhancement of foodstuff, which comprises adding sodium deoxy-5'-inosinate to the foodstuff.

6. A method for flavor enhancement of foodstuff, which comprises adding sodium deoxy-5'-guanylate to the foodstuff.

7. A method for flavor enhancement of foodstuff, which comprises adding sodium deoxy-5'-inosinate and sodium glutamate to the foodstuff.

8. A method for flavor enhancement of foodstuff, which comprises adding sodium deoxy-5'-guanylate and sodium glutamate to the foodstuff.

9. Foodstuff seasoned with at least one member selected from the group consisting of deoxy-5'-inosinic acid, deoxy-5'-guanylic acid, deoxy-5'-xanthylic acid and their non-toxic base salts.

10. Foodstuff seasoned with deoxy-5'-inosinic acid.

11. Foodstuff seasoned with deoxy-5'-guanylic acid.

12. Foodstuff seasoned with sodium deoxy-5'-inosinate.

13. Foodstuff seasoned with sodium deoxy-5'-guanylate.

14. In the processing of foodstuff, the improvement of flavor enhancement by the step of adding at least one member selected from the group consisting of deoxy-5'-inosinic acid, deoxy-5'-guanylic acid, deoxy-5'-xanthylic acid and their non-toxic base salts to the foodstuff.

15. In the processing of foodstuff, the improvement of flavor enhancement by the step of adding at least one member selected from the group consisting of deoxy-5'-inosinic acid, deoxy-5'-guanylic acid, deoxy-5'-xanthylic acid and their non-toxic base salts together with sodium glutamate to the foodstuff.

16. In the processing of foodstuff, the improvement of flavor enhancement by the step of adding deoxy-5'-inosinic acid to the foodstuff.

17. In the processing of foodstuff, the improvement of flavor enhancement by the step of adding deoxy-5'-guanylic acid to the foodstuff.

18. In the processing of foodstuff, the improvement of flavor enhancement by the step of adding sodium deoxy-5'-inosinate to the foodstuff.

19. In the processing of foodstuff, the improvement of flavor enhancement by the step of adding sodium deoxy-5'-guanylate to the foodstuff.

20. In the processing of foodstuff, the improvement of flavor enhancement by the step of adding sodium deoxy-5'-inosinate and sodium glutamate to the footstuff.

21. In the processing of foodstuff, the improvement of flavor enhancement by the step of adding sodium deoxy-5'-guanylate and sodium glutamate to the footstuff.

References Cited by the Examiner

UNITED STATES PATENTS

| | | | |
|---|---|---|---|
| 2,174,475 | 9/39 | Ostern | 195—12 |
| 2,844,514 | 7/58 | Morell et al. | 195—30 |
| 2,920,965 | 1/60 | Ziegler et al. | 99—97 X |
| 2,928,740 | 3/60 | Rosenthal et al. | 99—97 X |
| 2,946,688 | 7/60 | Rosenthal et al. | 99—97 |
| 3,104,171 | 9/63 | Sakaguchi et al. | 99—140 |

OTHER REFERENCES

"The Chemistry and Biology of Yeasts," edited by A. H. Cook Academic Press Inc., New York, 1958, pages 493 and 494, and pages 173 to 184.

A. LOUIS MONACELL, *Primary Examiner.*

BEATRICE H. STRIZAK, *Examiner.*